US009014865B2

(12) United States Patent
Glas

(10) Patent No.: US 9,014,865 B2
(45) Date of Patent: Apr. 21, 2015

(54) METHOD FOR MONITORING AN INSTALLATION

(75) Inventor: Karl Glas, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 396 days.

(21) Appl. No.: 13/492,153

(22) Filed: Jun. 8, 2012

(65) Prior Publication Data

US 2012/0316694 A1  Dec. 13, 2012

(30) Foreign Application Priority Data

Jun. 10, 2011 (EP) .................................. 11169446

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G05B 19/042* (2006.01)

(52) U.S. Cl.
CPC .................................. *G05B 19/042* (2013.01)

(58) Field of Classification Search
CPC .................................................. G05B 19/042
USPC ...................... 700/22, 86, 291, 295–298, 286
See application file for complete search history.

(56) References Cited

U.S. PATENT DOCUMENTS

| 7,177,708 B2* | 2/2007 | Glas et al. ........................ 700/19 |
| 7,514,815 B2* | 4/2009 | Paik et al. ........................ 307/64 |
| 7,698,011 B2* | 4/2010 | Tsuda et al. ................... 700/108 |
| 8,362,655 B2* | 1/2013 | Landgraf et al. .............. 307/116 |
| 8,368,321 B2* | 2/2013 | Chemel et al. ................ 315/294 |
| 2002/0143410 A1 | 10/2002 | Yance et al. |
| 2003/0055900 A1* | 3/2003 | Glas et al. ...................... 709/205 |
| 2005/0222691 A1* | 10/2005 | Glas et al. ........................ 700/19 |
| 2009/0125737 A1* | 5/2009 | Brey et al. ...................... 713/322 |
| 2009/0204695 A1* | 8/2009 | Busgen et al. ................. 709/223 |
| 2010/0138003 A1 | 6/2010 | August et al. |
| 2010/0168897 A1* | 7/2010 | August et al. ................. 700/105 |
| 2011/0251807 A1* | 10/2011 | Rada et al. ...................... 702/61 |
| 2012/0262093 A1* | 10/2012 | Recker et al. ................. 315/308 |

FOREIGN PATENT DOCUMENTS

| CN | 101377678 A | 3/2009 |
| CN | 201732278 U | 2/2011 |
| DE | 10 2008 035 756 | 2/2010 |
| EP | 2 192 457 | 6/2010 |
| EP | 2 192 458 | 6/2010 |
| JP | 2008-112209 | 5/2008 |

* cited by examiner

*Primary Examiner* — Ramesh Patel
(74) *Attorney, Agent, or Firm* — Cozen O'Connor

(57) ABSTRACT

A method for monitoring an installation having first and second energy operating states, and a different energy consumption in the first and second energy operating states, wherein the method comprising changing over the installation by a first switching command from the first into the second energy operating state, determining a first changeover time period between the beginning of the changeover process and the attainment of the second energy operating state, and storing the first changeover time period in a database for changeover time periods which is assigned to the installation, storing state information, determined using the first changeover time period, regarding the installation in a state database assigned to the installation.

17 Claims, 2 Drawing Sheets

METHOD FOR MONITORING AN INSTALLATION

BACKGROUND OF THE INVENTION

1. Field of the Invention

The present invention relates to a method for monitoring an installation having a first and second energy operating state, where the installation has different energy consumptions in the first and second energy operating states.

2. Description of the Related Art

Methods for monitoring an installation this type are generally known. For example, the European patent publications EP 2 192 457 A1 and EP 2 192 458 A1 describe methods for activating one of a plurality of activatable operating states of a technical installation, in which, before the installation is changed over into a different operating state, a check is performed to determine whether the requested change of an operating state is allowed by predetermined parameter limits.

SUMMARY OF THE INVENTION

It is accordingly an object of the present invention to provide an improved method for monitoring installations having at least two energy operating states.

This and other objects and advantages are achieved in accordance with the invention by providing a method for monitoring an installation having a first and a second energy operating state, where the installation has a different energy consumption in the first and second energy operating states in which the installation is changed over by a first switching command from the first energy state into the second energy operating state, a first changeover time period between the beginning of the changeover process and the attainment of the second energy operating state is determined, and the first changeover time period is stored in a database for changeover time periods which is assigned to the installation, and/or state information, determined using the first changeover time period, regarding the installation is stored in a state database assigned to the installation.

The first energy operating state can be, for example, a normal or working state of the installation and the second energy operating state can be an energy saving state of the installation. Here, in the energy saving state provision can be made, for example, for switching off installation parts or operating these installation parts at least with reduced energy. In such or similar cases, changing over between such operating states can correspond to at least partially starting up or shutting down the installation or installation parts. From the start-up or shut down times then determined, a general or else specific functional, operating and/or technical state of the installation or of parts of the installation can often be deduced. Particularly through a comparison of a changeover time period determined with one or more previously measured values, one or more predetermined values and/or also with a predetermined threshold value, it is possible to identify, for example, changes within an installation or in installation parts (e.g., wear, abrasion and/or ageing phenomena). Afterward, servicing and/or maintenance measures or else corresponding exchange measures in respect of parts or components can thereupon be instigated at an early stage, for example, whereby it is then subsequently possible, e.g., to prevent or at least delay a potential total failure of the installation.

Thus, by way of example, upon each shut down and/or start-up of the installation or of installation parts, the respective changeover time periods can be detected and subsequently compared with logged data or predetermined data. From the comparison of such time values (e.g., a lengthening of the start-up time, for example, on account of mechanical inertia changes, wear or ageing phenomena of the installation), on the basis of predetermined tolerance values, e.g., it is possible to derive suitable measures, such as servicing or maintenance measures in respect of the installation or else an apparatus exchange or machine exchange. As a result of gradually lengthening changeover time periods, for example, it is possible to identify installation faults, e.g., at an early stage and, under certain circumstances, before an installation failure. As a result of servicing measures defined based on predetermined threshold values, for example, the installation can then be brought into an improved state again in a timely manner, for example, as a result of which relatively long outage times can, under certain circumstances, be avoided or delayed.

In connection with the present description, an "installation" is understood to mean a technical installation. Such technical installations can comprise, for example, a plurality of elements, installation parts or installation segments. Installation elements can be, for example, a wide variety of sensors, drives, conveying elements, robot units or the like. An installation can be configured, for example, as a production installation, as a production machine, as a conveying installation, as a conveying machine, as a machine tool, as a processing installation, as a robot and/or as a technical apparatus, such as a measuring and/or control apparatus or comprise apparatuses or installations of this type.

The first energy operating state can be a normal operating state, for example, in which the installation performs its envisaged task without significant restrictions. The second energy operating state can be embodied as an energy saving state, for example, in which the installation consumes less energy than in the normal operating state and, for example, performs its tasks only to a restricted extent (e.g., more slowly and/or in a manner having fewer partial tasks), or no longer performs its tasks.

By way of example, even further energy operating states having different energy consumption values and/or activity levels of the installation can additionally be provided. The method described for two energy operating states in the present description can correspondingly also be applied to more than two energy operating states, in which, for example, the changeover time periods are determined between all of these energy operating states or else only between selected changeover processes.

A different energy consumption of the energy operating states can be understood to mean, for example, a different total consumption of energy in the respective operating states by the installation. The energy consumption of the installation can be composed, for example, of electrical energy and/or other forms of energy, such as a drive energy, e.g., by an internal combustion engine or a fuel cell. Furthermore, the energy consumption taken as a basis for the present method can also be restricted merely to parts of the energy consumed by the installation, such as exclusively to consumed electrical energy. The consumption taken as a basis for determining the energy consumption in the different operating states can also be restricted to the energy consumption of specific installation parts.

The first switching command for changing over the installation from the first into the second energy operating state can be initiated, for example, externally (e.g., from an external apparatus, such as a control apparatus or outside the installation) or internally (e.g., on account of dedicated evaluation within the installation itself) or be effected from either one of these locations. An internal initiation of such a first switching command can be effected, for example, on account of an evaluation based on specific operating parameters or operator control parameters, such as "no operator control action" or "no enquiry" over a specific, predetermined period and/or specific pause and/or night times. Furthermore, it is also possible, for example, to initiate an internal switching command by an external trigger command in association with the internal checking of specific conditions.

The evaluation of the comparison can be effected in this case, e.g., in a manner initiated automatically, by a person or by one or more input commands. It can be effected, e.g., in a control unit, a controller, PC or else manually.

In particular, the changeover of the installation, the first and second energy operating states and/or the first switching command, can be configured in accordance with the "PROFIenergy" standard or a comparable standard.

Furthermore, the abovementioned method can also be extended to changing over the installation from the second into the first energy operating state and into further energy operating states possibly provided and between such energy operating states. For example, provision can be made for logging all such changeover processes between such energy operating states. Provision can also be made for detecting and logging only a selection of changeover processes between such energy operating states in accordance with the presently disclosed embodiments.

The beginning of the changeover process for determining the first changeover time period can correspond, for example, to the access or internal processing of the first switching command or to an instant assigned to such an access or such processing. The attainment of the second energy operating state can correspond, for example, to the attainment of a defined or predetermined instant in the second energy operating state, e.g. the attainment of a stable steady-state condition or else to the implementation of an internal signaling, message and/or feedback that the second energy operating state has been attained.

The database for changeover time periods and/or the state database can be provided, for example, within the installation or else in an external device, such as a control device for the installation (e.g., a programmable logic controller), an operator control and observation device, a network drive and/or similar external devices.

In the context of the presently disclosed embodiments, a database is understood to mean, e.g., a storage area that is configured in terms of hardware and software for storing the datum mentioned in this regard, or the data mentioned in this regard. In particular, a database is also understood to mean, e.g., a data collection of data of identical type or data groups, which in the present case comprise one or more changeover time periods.

The state information determined using the first changeover time period can be or comprise, for example, a time duration or duration in terms of operating hours until the next maintenance or servicing measure, or a classification into two or more state categories. Here, the state information can be determined, for example, exclusively based on the changeover time period determined or a plurality of changeover time periods determined and/or a predetermined changeover time period. Furthermore, the state information can, however, also be determined taking further property parameters of the installation into consideration (such as an operating temperature, an energy consumption or an evaluation of acoustic information).

In one advantageous embodiment of the method in accordance with the invention, the first changeover time period determined is compared with at least one changeover time period measured earlier for the changeover of the apparatus from the first into the second energy operating state and/or with a predetermined changeover time period for the changeover of the apparatus from the first into the second energy operating state, and then this comparison is optionally furthermore evaluated.

In this way, for example, by comparing the changeover time period determined with one or more changeover time periods measured earlier, it is possible to determine whether, for example, a start-up or shut down time for the installation changes by a specific magnitude or percentage and/or to what extent changes between two or more changeover time periods, for example, increase, remain the same, or decrease. In this way, e.g., based on the change in the changeover time periods, it is possible to deduce a servicing or operating state of the installation and subsequently, if appropriate, to initiate corresponding servicing or exchange activities.

Furthermore, by comparing the changeover time period determined with a predetermined value, for example a desired time value for the corresponding state changeover, it is possible to determine the extent to which the current changeover time period deviates from the predetermined value. Based on this information, it is then possible, e.g., in turn to deduce a servicing or operating state of the installation.

In the context of a further evaluation of the comparison possibilities mentioned, it is then possible to determine, for example, information that corresponds to a servicing or operating state and/or that provides an indication of possible and/or necessary servicing or exchange work. Furthermore, it may be provided that, in the context of such an evaluation, provision can be made for outputting warning information, for example, if the evaluation yields a specific result. Such warning information can be or comprise, for example, a servicing recommendation, a required servicing or exchange measure within a specific predetermined period or the like. Furthermore, such warning information can be or comprise, for example, requests of servicing and/or maintenance measures, warning of apparatus, installation and/or component failure, request of apparatus, installation and/or component exchange or similar information messages or signals.

Warning information, such as that mentioned, for example, can be output, e.g., if the deviation between an actual value and desired value for the changeover time exceeds a certain, predetermined threshold value. Furthermore, such warning information can be output, for example, if the changes between the present and the previous changeover time period exceeds a predetermined threshold value.

The warning information can be output, for example, via an indicator unit or optical display elements or the like. Furthermore, the output of warning information can also comprise an electronic message or be effected in the context of the outputting of electronic information or an electronic message. Such messages can be output, for example, to an external monitoring unit, an external or internal control unit, an external or internal operator control or observation unit or else an external or internal optical display or acoustic indicator unit (e.g., a panel PC). The output of the warning information can, for example, also be configured as acoustic information or acoustic signal or encompass such.

The warning information or the outputting of the warning information can also be linked with the operating states or time periods, such as in a control unit and/or a programmable logic controller, or with the processing thereof.

Before the installation is changed over by the first switching command, provision can be made for the installation to receive a changeover enquiry having at least one changeover parameter. The installation then evaluates this enquiry taking the changeover parameter into consideration and initiates the first changeover command, e.g., when the evaluation of the enquiry reveals that a changeover from the first into the second energy operating state is intended to be performed. Such changeover parameters can comprise, for example, an envisaged switch-off or pause instant. Furthermore, the changeover parameter can also comprise a predetermined switch-off or pause period. The changeover enquiry or the changeover parameters can be configured and/or designed, for example, for a changeover enquiry in accordance with the "PROFIenergy" standard or a comparable standard.

Thus, by way of example, after receiving a changeover enquiry having an envisaged pause period as a changeover parameter, for example, based on the internal installation parameters, such as the predetermined shut down and start-up times and also further installation characteristic variables, the installation can decide whether the installation is intended to be shut down into an energy saving state, for example, for a certain pause period or whether the pause for shut down is, e.g., too short, because a shut down and then restart would possibly be too uneconomic or simply impossible from a temporal standpoint. Depending on the result of the evaluation, the installation then moves, e.g., into the energy saving state mentioned, or else does not.

It is possible, as already mentioned above by way of example, for one or more predetermined and/or determined changeover times from the first into the second energy operating state, or from the second energy operating state into the one or more predetermined and/or determined changeover times, to be solely or concomitantly taken into consideration in the evaluation of the changeover enquiry. In particular, the changeover parameters and the enquiry evaluation can, for example, in turn be configured in accordance with the PROFIenergy standard or a comparable standard.

The abovementioned object is also achieved by an installation which is configured such that it can be operated in a first and a second energy operating state, where the installation has a different energy consumption in the first and second energy operating states, and the installation furthermore comprises a control device, which is configured to implement the disclosed embodiments of the method in accordance with the invention.

As already explained in connection with the above-described embodiments of the method in accordance with the invention, the abovementioned logging of the changeover time affords an improved possibility of monitoring the installation and in this case, e.g., logging, analyzing and evaluating installation states.

Here, the first and second energy operating states and the installation can be configured as explained in greater detail by way of example in the present disclosure.

The control device can be configured, for example, as a controller, a programmable logic or comparable controller, part of such a controller, or as a computer, PC or similar data processing device. Furthermore, the controller can, for example, also be completely integrated structurally into the installation. The control device can also be partly integrated structurally with the installation, in which case a further part of the control device can be situated outside the installation and can be connected to the control device, for example, over a wireless network such as a field bus network. The control device can also be provided structurally completely outside other or the other parts of the installation and be connected to these other parts of the installation over a wireless or wire-based communication network such as a field bus network.

Furthermore, the installation can comprise a storage device for storing the first changeover time period, the state information regarding the installation, the at least one changeover time period measured earlier, the database for changeover time periods, the state database and/or the predetermined changeover time period.

This configuration makes it possible, for example, to store the abovementioned information directly with the installation or in association with the installation and then also to evaluate the stored information, under certain circumstances. Here, the storage device can, for example, be part of the abovementioned control device or else a separate device for storing the data mentioned.

The installation can also comprise an output device for outputting warning information in accordance with the disclosed embodiments. In particular, the output device can be configured as an optical, acoustic and/or electronic output device and/or as a wire-based or wireless interface for outputting and forwarding corresponding messages or information. Here, the output device can in turn be arranged and structurally configured as a unit with the installation, or else only be connected to the installation by means a communication link and otherwise be structurally separate.

The control device can furthermore be configured to receive a changeover enquiry in accordance with the present description, for performing a corresponding enquiry evaluation in accordance with the presently disclosed embodiment for initiating the first changeover command in accordance with the presently disclosed embodiment. In particular, the control device can be configured to receive, for processing and for implementing and also for forwarding commands, information and messages in accordance with the PROFIenergy standard and/or a comparable standard. In particular, the control device can also be configured to control further installations or apparatuses and have as such at least one component which is also configured to output changeover enquiries or corresponding PROFIenergy commands and/or comparable commands.

The abovementioned object is furthermore achieved by an installation system which is configured to implement the method in accordance with the presently disclosed embodiments, where the installation system comprises an installation in accordance with the disclosed embodiments and an external control device, which is configured for the open-loop and/or closed-loop control of the installation over a wire-based or wireless interface.

The external control device can be, for example, a control system, such as a computer, a programmable logic controller or a controller, for controlling the entire installation, for controlling partial tasks of the installation, for controlling the energy operating states of the installation and/or also for controlling further installations and apparatuses. Here, the external control device can be configured, for example, for communication over a wireless or wire-based communication network, such as a Transmission Control Protocol/Internet Protocol (TCP/IP) network, an Ethernet network or a field bus network (e.g., in accordance with the PROFINET or the PROFIBUS standard). Thus, the control device can be, for example, a control installation for controlling a complete production line or the like.

The external control device can comprise, for example, a storage device for storing the first changeover time period, the state information regarding the installation, the at least one changeover time period measured earlier, the database for changeover time periods, the state database and/or the predetermined changeover time periods. Here, provision can be made, for example, for the abovementioned data, or parts thereof, to be stored both in the installation and in the external control device or only in one of the two devices mentioned.

Moreover, the external control device can comprise an output device for outputting warning information in accordance with the present description, in which case the output device can in turn be configured in accordance with the presently disclosed embodiments. Furthermore, the external control device can be configured to output a changeover enquiry in accordance with the presently disclosed embodiments to the installation.

In addition, the external control device can be configured to control comparable energy operating states of further installations or apparatuses. Thus, for example, the external control device can be configured at least, inter alia, for the energy management of the installation and/or of further installations and apparatuses, in which case the energy management can be configured, for example at least, inter alia, in accordance with the PROFIenergy standard and/or comparable standards or methods.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained below by way of example with reference to the accompanying figures, in which.

DETAILED DESCRIPTION OF THE PREFERRED EMBODIMENTS

Figure 1:
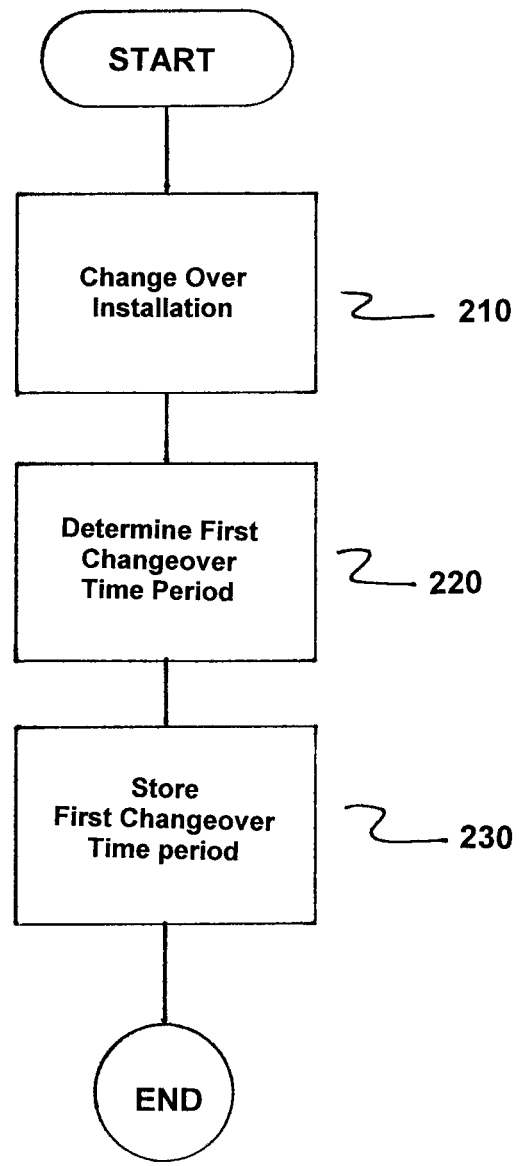
FIG. 1 is a schematic block diagram of an exemplary installation in accordance with the invention and FIG. 2 is a flowchart of the method in accordance with an embodiment of the invention.

FIG. 1 shows a machine tool 120, which is an exemplary installation in accordance with the invention. The machine tool 120 comprises an internal controller 130 having a storage device, where the controller 130 controls, over a field bus network 134, a processing robot 150 of the machine tool 120 and a transport system 140 for tools having a first drive 142 and a second drive 144. Here, the machine tool 120 forms part of a larger production complex, which is not illustrated in FIG. 1 for purposes of clarity.

The machine tool 120 and the other production installations (not shown) are controlled by a superordinate programmable logic controller (PLC) 110 having an internal storage device 112 over a field bus network 114 embodied as "PROFINET". The controller 130 of the machine tool 120 receives corresponding commands from the PLC 110 over the field bus network 114, where the controller 130 then analyzes and converts the commands into corresponding actuating and working commands that are provided to the conveying device 140 having the drives 142 and 144 and also provided to the processing robot 150.

Here, the controller 130 is an exemplary control device in accordance with the present invention. The PLC 110 together with the controller 130 can also be an example of a control device in accordance with the present invention. Furthermore, the PLC 110 is an example of an external control device in accordance with the present invention.

The machine tool 120 has three energy operating states:

a "normal state", in which all installation parts 140, 142, 144, 150 and the controller 130 of the machine tool 120 are fully in operation and are supplied with energy, such that the machine tool 120 can implement the envisaged tasks within the full scope as envisaged;

a "pause state" in which the mechanical portions of the machine tool 120, the drives 142, 144 and the tool robot 150 are deactivated, but the controller 130 is in operation within the full scope, such that the controller 130 can analyze and evaluate commands coming from the PLC 110 at any time; and an "energy saving state", in which, alongside the mechanical installation parts of the machine tool 120, the drives 142, 144 and the processing robot 150, the controller 130, too, is in a reduced activity state such that only that part of the controller 130 which is necessary for receiving and analyzing a corresponding activation command from the PLC 110 is supplied with energy.

Here, the installation has the highest total consumption of supplied electrical energy in the normal state, the next lower total consumption in the pause state and the lowest total consumption of electrical energy in the energy saving state.

The PLC 110 is configured to output pause commands and wake-up commands. Here, a pause command furthermore includes information about the envisaged length of the pause. Based on this pause length, the controller 130 of the machine tool 120, which is in the normal state, for example, can then decide, for example, whether to leave the machine tool 120 in the normal state during the pause, to place the machine tool 120 into the pause state or even to place the machine tool 120 into the energy saving state.

In the storage device 132 of the controller 130, predetermined changeover times between the abovementioned energy operating states are stored in a corresponding database. After receiving a corresponding pause command, the controller 130, in the case of a machine tool 120 in the normal state, can then compare the changeover time in, for example, the pause state and the start-up time incurred upon switching back into the normal state with the planned pause time and, for example, leave the machine tool 120 in the normal state if, after subtraction of the shut down and start-up time, no or only a short pause time remains, such that shutting down into the pause or energy saving state would be uneconomic. If an average pause time of, for example, a few minutes, a few tenths of minutes or a few hours remain after subtraction of the changeover times, then the controller 130 can, for example, place the machine tool 120 into the pause mode, from which the machine too 120 can be restarted relatively rapidly. In the case of even longer pauses, such as over a few hours, over many hours, overnight or over a weekend, the controller 130 can then place the machine tool 120 into the energy saving state, where the maximum energy saving is achieved, although the longest shut down and/or start-up time is also required.

Moreover, the controller 130 determines, for each of the abovementioned shut down and/or start-up processes for the machine tool between the abovementioned energy operating states, the changeover time actually incurred and stores this time in a corresponding database in the storage device 132 of the controller 130. The changeover time can be, for example, the time that elapses between the output of a corresponding changeover command of the controller 130 and the attainment of the new energy operating state. Here, the attainment of the new energy operating state can be provided, for example, when the corresponding operating state is registered as present or the operating state is present for the first time or in a stable manner in the controller 130.

In an evaluation step directly succeeding the storage, for example, the measured changeover time is then compared with previously measured changeover times and a predetermined changeover time for the corresponding changeover process. If the currently measured changeover time deviates from the last measured changeover time value and/or from the preset changeover time value by more than a respectively predetermined threshold value, then a warning message is output using an indicator device (e.g., display) 160 of the machine tool 120. From this warning message, a user can recognize that a switch-on or switch-off time has lengthened by a critical value and that it is necessary to check the drives 142, 144 and the tool robot 150. In this way, an imminent installation failure can be prevented.

The abovementioned analysis step can also be effected in a separate analysis sequence. This can be provided thus, for example, as standard or after the machine tool 120 has been switched from the energy saving state, e.g., into the normal state again, because the controller 130 cannot perform the analysis step in the energy saving state.

Moreover, provision is made for the changeover times that are stored in the storage device 132 of the controller 130 to be transmitted regularly, for example, at regular time intervals, or always after the detection of a value, into a corresponding database in the storage device 112 of the PLC 110. This information can then be used, for example, in the abovementioned manner, such as to plan servicing or maintenance activities or to plan the exchange of machine components.

The presently disclosed embodiments of the invention thus relate to a method for monitoring an installation, in which, when the installation changes into different energy operating states, such as between a normal state and one or more energy saving states, the respective changeover times, i.e., shut down and/or start-up times, are detected and logged. From a comparison of the changeover times determined with past changeover times and/or predetermined desired or standard values, it is possible to draw a conclusion about the state of the installation and thus to initiate servicing, maintenance and exchange measures in a timely manner.

Figure 2:
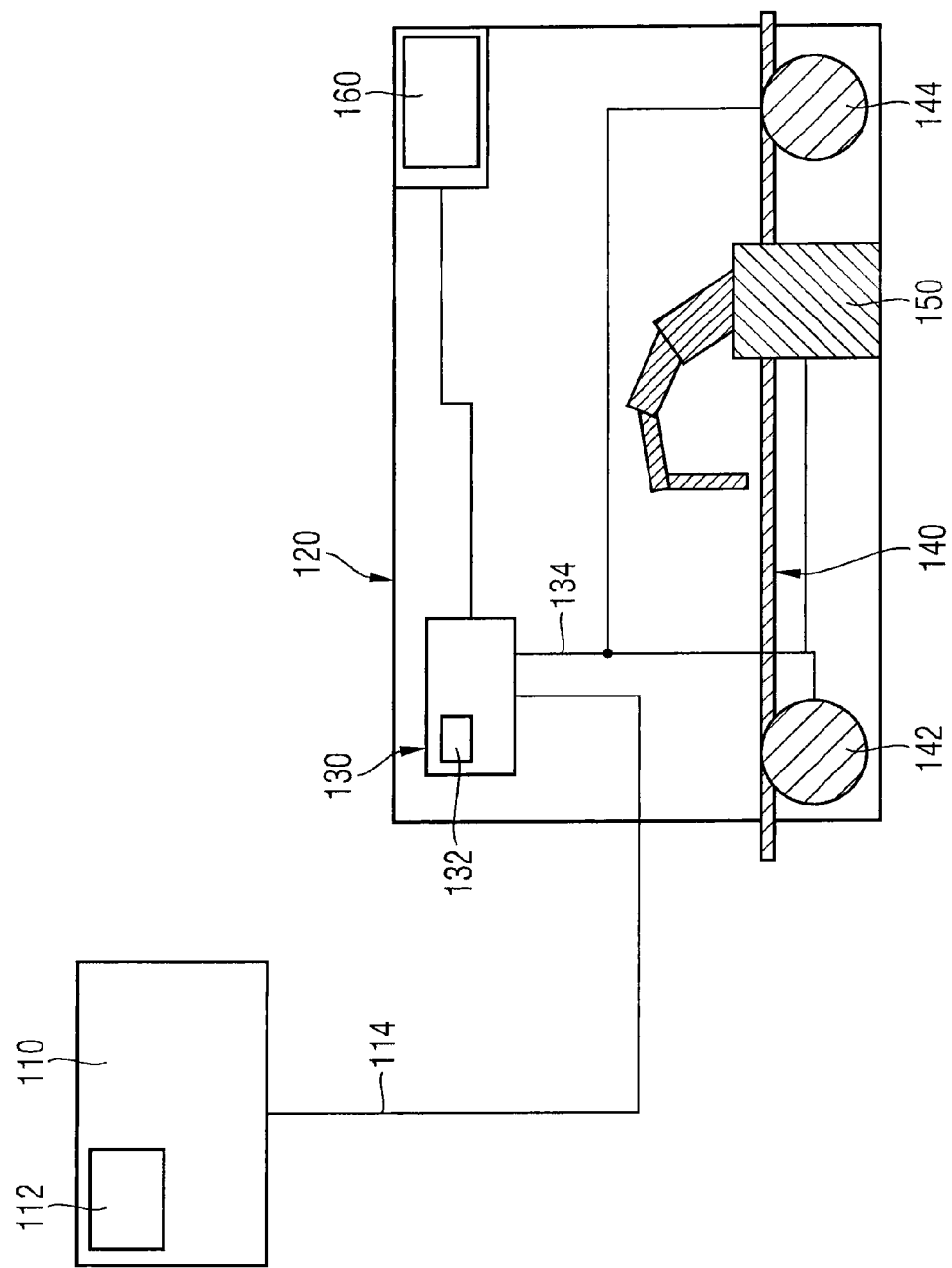

FIG. 2 is flow chart of a method for monitoring an installation having a first and a second energy operating state, where the installation has a different energy consumption in the first and second energy operating states. The method comprises changing over, in a changeover process, the installation from the first energy operating state into the second energy operating state in response to a first switching command, as indicated in step 210. A first changeover time period between a beginning of the changeover process and attainment of the second energy operating state is determined, as indicated in step 220.

At least one of the first changeover time period in a database for changeover time periods assigned to the installation, and state information, determined using the first changeover time period, regarding the installation in a state database assigned to the installation is stored, as indicated in step 230.

Thus, while there have shown and described and pointed out fundamental novel features of the invention as applied to a preferred embodiment thereof, it will be understood that various omissions and substitutions and changes in the form and the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring a production installation having a first and a second energy operating state, the production installation having a different energy consumption in the first and the second energy operating state, the method comprising:

a) changing over, in a changeover process, the production installation from the first energy operating state into the second energy operating state in response to a first switching command;

b) determining a first changeover time period between a beginning of the changeover process and attainment of the second energy operating state; and c) storing at least one of the first changeover time period in a database for changeover time periods assigned to the production installation, and state information, determined using the first changeover time period, regarding the production installation in a state database assigned to the production installation.

2. The method as claimed in claim 1, further comprising:

d) comparing the first changeover time period with at least one of at least one earlier measured changeover time period for the changeover of the production installation from the first energy operation state into the second energy operating state and a predetermined changeover time period for the changeover of the production installation from the first energy operating state into the second energy operating state; and e) evaluating the comparison.

3. The method as claimed in claim 2, further comprising:

(f) outputting warning information indicating a critical operating state of the production installation based on the step of evaluating.

4. The method as claimed in claim 1, further comprising, before step a.):

receiving, by the production installation, a changeover enquiry with at least one changeover parameter; and initiating, by the production installation, the first changeover command on account of an enquiry evaluation using the at least one changeover parameter.

5. The method as claimed in claim 4, wherein the at least one changeover parameter comprises at least one of an envisaged switch-off, pause instant and one of an envisaged switch-off, pause period.

6. The method as claimed in claim 4, wherein at least one of the determined first changeover time period and at least one predetermined changeover time are concomitantly taken into consideration in the enquiry evaluation.

7. The method as claimed in claim 5, wherein at least one of the determined first changeover time period and at least one predetermined changeover time are concomitantly taken into consideration in the enquiry evaluation.

8. A production installation, the production installation being configured and operable in first and second energy operating states, and having a different energy consumption in the first and the second energy operating state, the production installation comprising:

a control device configured to:

a) change over, in a changeover process, the production installation from the first energy operating state into the second energy operating state in response to a first switching command;
b.) determine a first changeover time period between a beginning of the changeover process and attainment of the second energy operating state; and
c) store at least one of the first changeover time period in a database for changeover time periods assigned to the production installation, and state information, determined using the first changeover time period, regarding the production installation in a state database assigned to the production installation.

9. The production installation as claimed in claim 8, further comprising:
a storage device configured to store at least one of the first changeover time period, the state information regarding the production installation, at least one changeover time period measured earlier, the database for changeover time periods, the state database and the predetermined changeover time period.

10. The production installation as claimed in claim 8, wherein the production installation comprises an output device for outputting warning information indicating a critical operating state of the production installation based on an evaluated comparison of the determined first changeover time period with at least one of an earlier measured changeover time period and a predetermined changeover time period.

11. The production installation as claimed in claim 9, wherein the production installation comprises an output device for outputting warning information indicating a critical operating state of the production installation based on an evaluated comparison of the determined first changeover time period with at least one of an earlier measured changeover time period and a predetermined changeover time period.

12. The production installation as claimed in claim 8, wherein the control device of the production installation is configured to receive a changeover enquiry for performing enquiry evaluations and for initiating the first changeover command.

13. A production installation system, comprising:
a production installation configured and operable in a first and a second energy operating state, and having a different energy consumption in the first and the second energy operating state, the production installation comprising:
a control device configured to:
a) change over, in a changeover process, the production installation the first energy operating state into the second energy operating state in response to a first switching command;
b) determine a first changeover time period between a beginning of the changeover process and attainment of the second energy operating state; and
c) store at least one of the first changeover time period in a database for changeover time periods assigned to the production installation, and state information, determined using the first changeover time period, regarding the production installation in a state database assigned to the production installation; and
d) an external control device configured and operable to control the production installation over a wire-based or wireless interface using at least one of open-loop control and closed-loop control.

14. The production installation system as claimed in claim 13, wherein the external control device comprises a storage device configured to store at least one of the first changeover time period, the state information regarding the production installation, the at least one changeover time period measured earlier, the database for changeover time periods, a state database and a predetermined changeover time period.

15. The production installation system as claimed in claim 13, wherein the external control device comprises an output device for outputting warning information indicating a critical operating state of the production installation based on an evaluated comparison of the determined first changeover time period with at least one of an earlier measured changeover time period and a determined changeover time period.

16. The production installation system as claimed in claim 14, wherein the external control device comprises an output device for outputting warning information indicating a critical operating state of the production installation based on an evaluated comparison of the determined first changeover time period with at least one of an earlier measured changeover time period and a determined changeover time period.

17. The production installation system as claimed in claim 13, wherein the external control device is configured to output a changeover enquiry to the production installation.

* * * * *